(12) United States Patent
Kuvantrarai

(10) Patent No.: US 7,834,752 B2
(45) Date of Patent: Nov. 16, 2010

(54) BRAKE-ACTUATED MESSAGE DEVICE

(76) Inventor: Jed K. Kuvantrarai, 19309 Flaming Arrow Cir., Walnut, CA (US) 91789

( * ) Notice: Subject to any disclaimer, the term of this patent is extended or adjusted under 35 U.S.C. 154(b) by 637 days.

(21) Appl. No.: 11/833,445

(22) Filed: Aug. 3, 2007

(65) Prior Publication Data
US 2009/0033481 A1 Feb. 5, 2009

(51) Int. Cl.
*B60Q 1/44* (2006.01)
*B60Q 1/50* (2006.01)
(52) U.S. Cl. ............ 340/479; 340/468; 340/471; 340/815.45; 362/503; 362/504; 362/541; 362/545; 362/548; 40/591; 40/593
(58) Field of Classification Search ............ 340/479, 340/468, 471, 473, 815.45; 40/593, 591; 362/541, 503, 504, 545, 548
See application file for complete search history.

(56) References Cited

U.S. PATENT DOCUMENTS

| | | | | | |
|---|---|---|---|---|---|
| 2,089,596 | A | * | 8/1937 | Buhr | 40/627 |
| 4,264,979 | A | * | 4/1981 | Gutowski | 455/77 |
| 4,631,516 | A | * | 12/1986 | Clinker | 340/464 |
| 4,736,280 | A | * | 4/1988 | Simidian | 362/540 |
| 4,916,584 | A | * | 4/1990 | Gustafson | 362/503 |
| 5,939,979 | A | * | 8/1999 | Lee | 340/479 |
| 6,404,334 | B1 | * | 6/2002 | Chao | 340/472 |
| 6,426,696 | B1 | * | 7/2002 | Ortega | 340/479 |
| 7,121,700 | B1 | * | 10/2006 | Scanlon | 362/493 |
| 7,154,387 | B2 | * | 12/2006 | Boomershine, III | 340/467 |
| 7,575,349 | B2 | * | 8/2009 | Bucher et al. | 362/503 |
| 2008/0120875 | A1 | * | 5/2008 | Yen | 40/204 |

* cited by examiner

*Primary Examiner*—Davetta W Goins
*Assistant Examiner*—Anne V Lai

(57) ABSTRACT

A brake-actuated message device. An illustrative embodiment of the brake-actuated message device includes a device casing having a front panel, a plurality of lights carried by the front panel, a message panel carried by the front panel generally adjacent to the plurality of lights, a message provided in the message panel, a lighting module connected to the plurality of lights and brake circuit wiring connected to the lighting module.

3 Claims, 8 Drawing Sheets

BRAKE-ACTUATED MESSAGE DEVICE

FIELD

The present invention relates to light-illuminated message devices. More particularly, the present invention relates to a brake-actuated message device which can be mounted on a vehicle.

BACKGROUND

Various media are known for displaying messages, logos and the like on vehicles. One of the most popular of these media includes bumper stickers which are attached to the vehicle using an adhesive. Other types of message-displaying media for vehicles include signs which are attached to the interior surfaces of windows in the vehicle.

SUMMARY

The present invention is generally directed to a brake-actuated message device. An illustrative embodiment of the brake-actuated message device includes a device casing having a front panel, a plurality of lights carried by the front panel, a message panel carried by the front panel generally adjacent to the plurality of lights, a message provided in the message panel, a lighting module connected to the plurality of lights and brake circuit wiring connected to the lighting module.

BRIEF DESCRIPTION OF THE DRAWINGS

The invention will now be described, by way of example, with reference to the accompanying drawings, in which.

DETAILED DESCRIPTION

Figure 1:
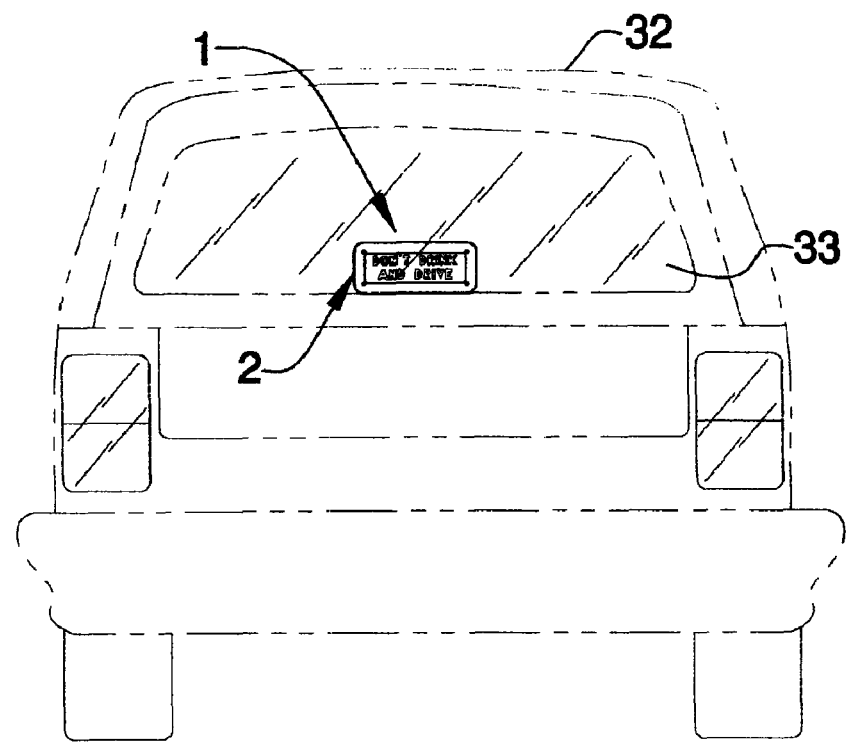
FIG. 1 is a rear view of a vehicle, with an illustrative embodiment of the brake-actuated message device mounted at the rear end of the vehicle.

Referring initially to FIGS. 1-6 of the drawings, an illustrative embodiment of the brake-actuated message device, hereinafter device, is generally indicated by reference numeral 1. As shown in FIG. 1 and will be hereinafter described, the device 1 is adapted to be mounted on a vehicle 32, such as behind the rear window 33 of the vehicle 32, for example. The device 1 is connected to the brake circuitry (not shown) of the vehicle 32 such that the device 1 is illuminated upon application of the brakes (not shown) of the vehicle 32, thus illuminating a message which is displayed by the device 1.

Figure 3:
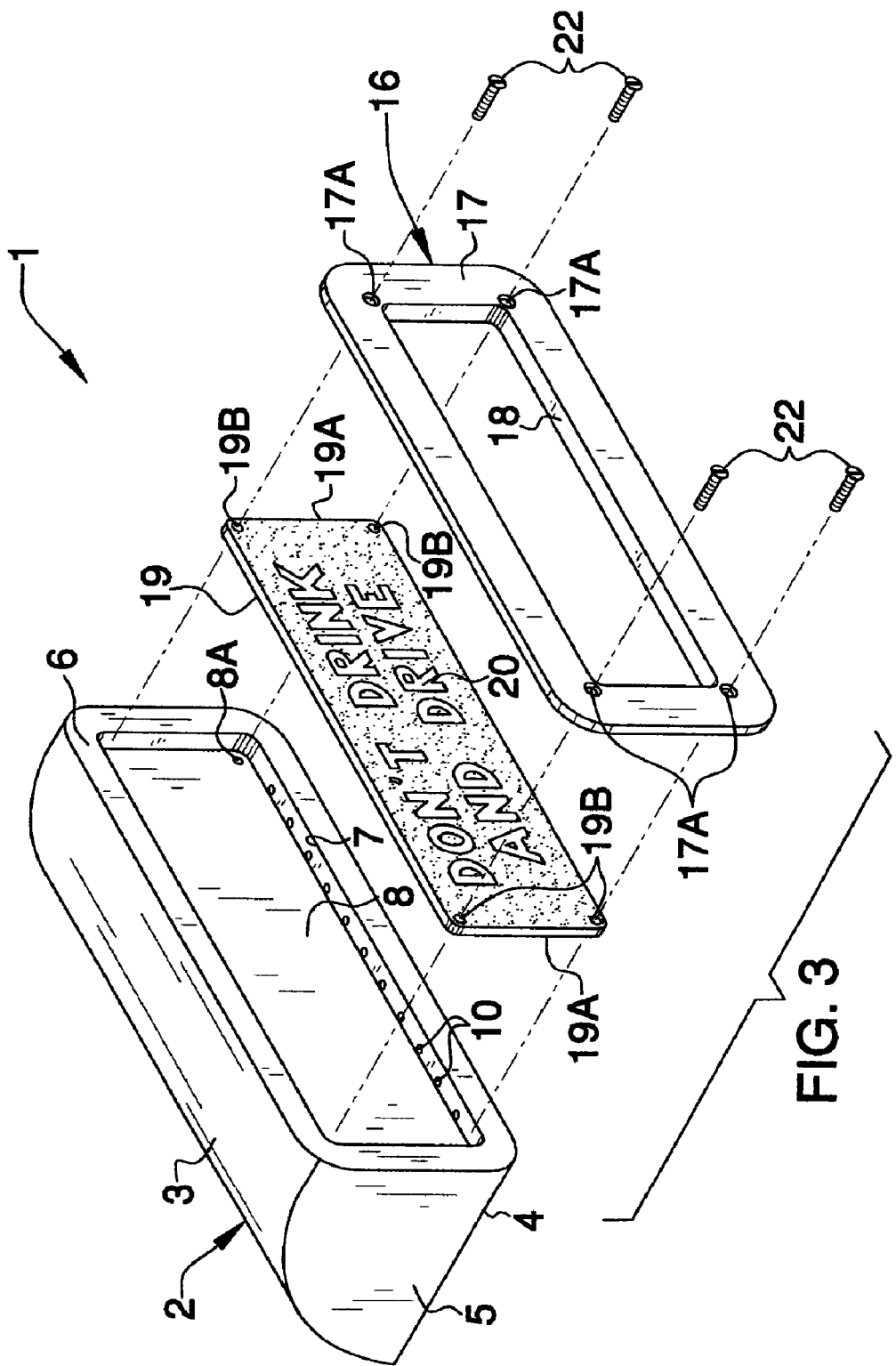
FIG. 3 is an exploded, front perspective view of an illustrative embodiment of the brake-actuated message device.
Figure 5:
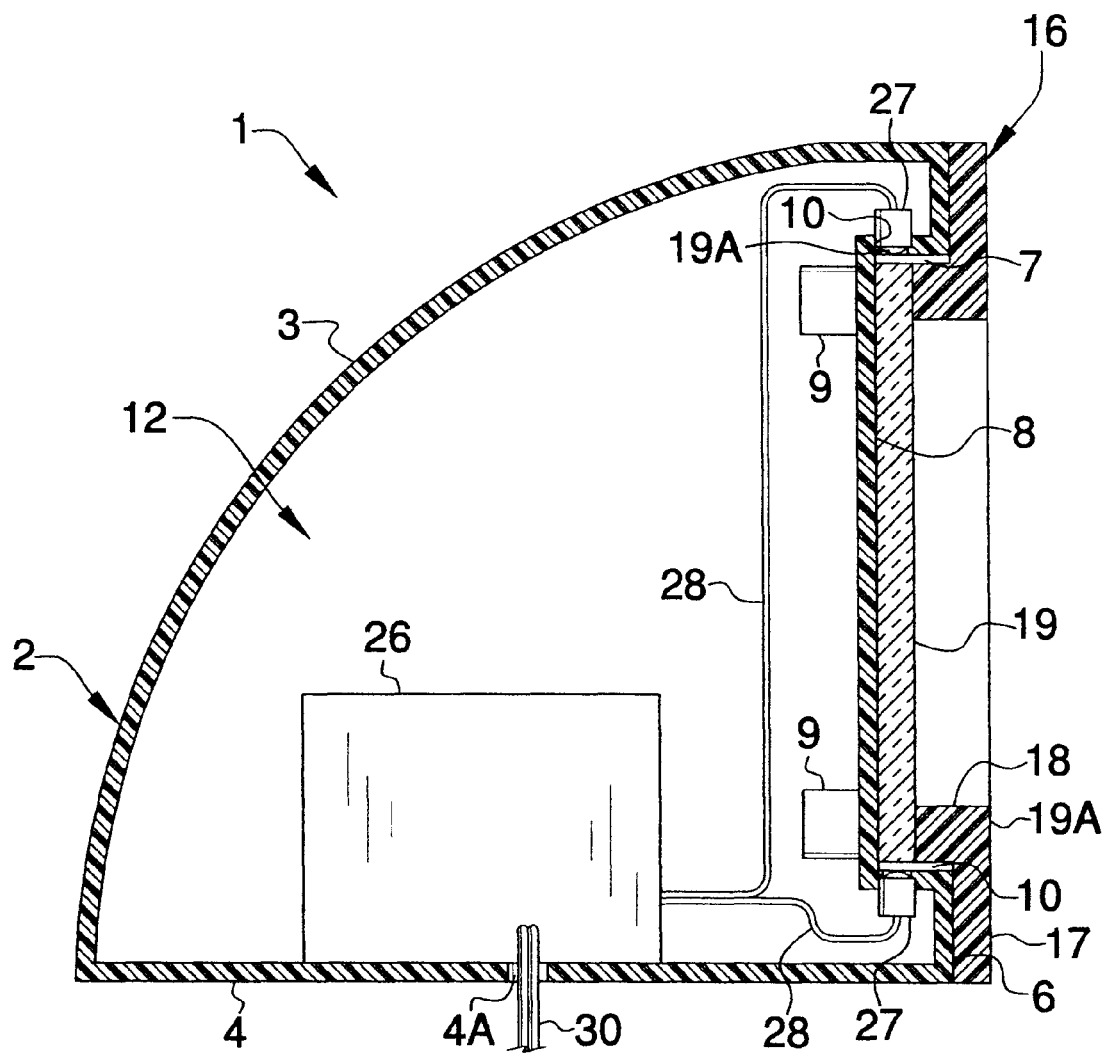
FIG. 5 is a cross-sectional view, taken along section lines 5-5 in FIG. 2, of an illustrative embodiment of the brake-actuated message device.
Figure 6:
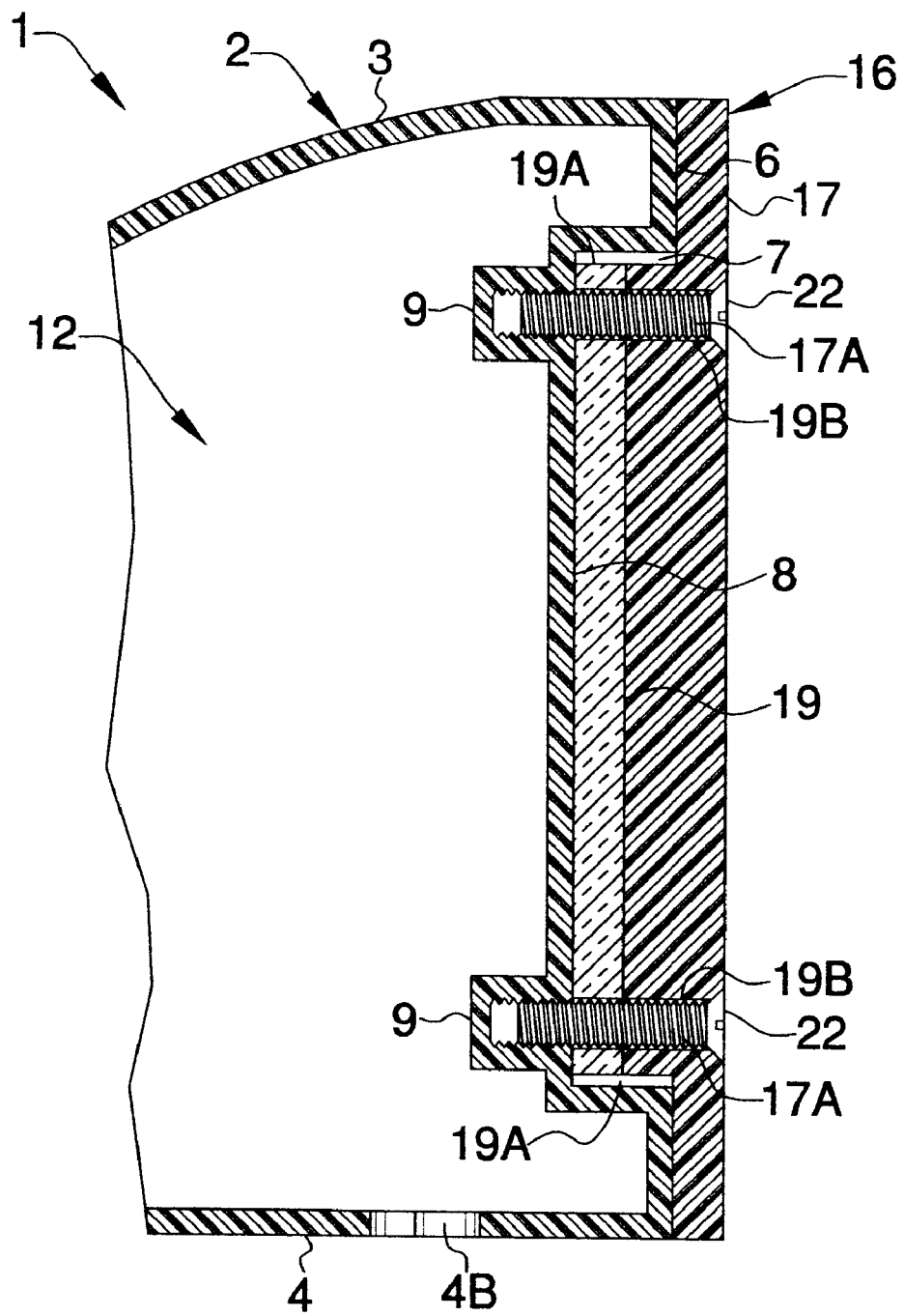
FIG. 6 is a cross-sectional view, taken along section lines 6-6 in FIG. 2, of an illustrative embodiment of the brake-actuated message device.

The device 1 includes a device casing 2 which may have a generally elongated shape, as shown, or may be any suitable alternative shape. The device casing 2 typically includes a generally curved rear panel 3, a bottom panel 4 which extends from the rear panel 3, a pair of spaced-apart side panels 5 which extends between the rear panel 3 and the bottom panel 4, and a front panel 6 which extends between the rear panel 3, the bottom panel 4 and the side panels 5. As shown in FIGS. 5 and 6, the device casing 2 has a casing interior 12. As shown in FIGS. 3, 5 and 6, a recess extension panel 7 extends from the front panel 6 into the casing interior 12. A recessed panel 8 extends from the recess extension panel 7. The recess extension panel 7 is disposed in generally perpendicular relationship with respect to each of the front panel 6 and the recessed panel 8.

Figure 4:
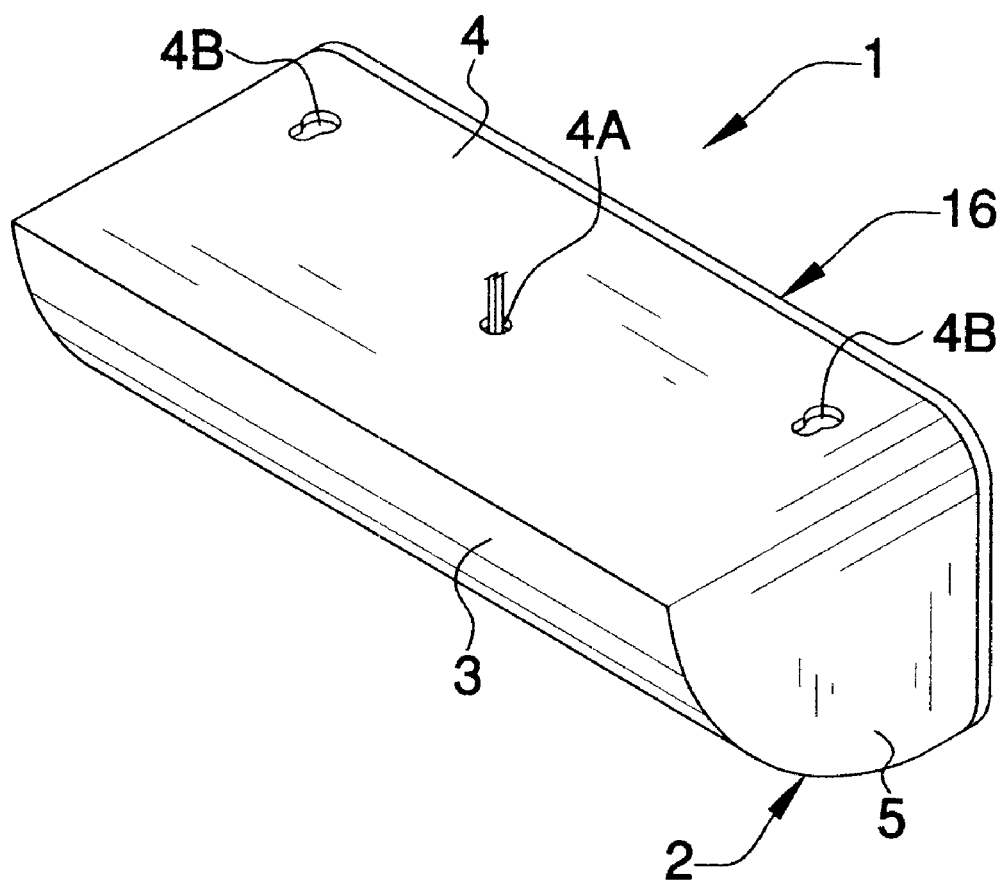
FIG. 4 is a bottom perspective view of an illustrative embodiment of the brake-actuated message device.

As further shown in FIGS. 5 and 6, multiple interiorly-threaded bosses 9 extend from the recessed panel 8, into the casing interior 12. Multiple fastener openings 8a (one of which is shown in FIG. 3) extend through the recessed panel 8 and communicate with the respective bosses 9. As shown in FIGS. 3 and 5, multiple, spaced-apart light openings 10 extend through the recess extension panel 7. As shown in FIGS. 4-6, a wiring opening 4a and a pair of spaced-apart mount openings 4b may extend through the bottom panel 4 for purposes which will be hereinafter described.

A message attachment 16 is provided on the front panel 6 of the device casing 2. In some embodiments, the message attachment 16 is detachably attached to the front panel 6. The message attachment 16 includes a generally elongated message attachment frame 17 having a frame slot 18. Multiple fastener openings 17a are provided in the message attachment frame 17. As shown in FIGS. 5 and 6, a message panel 19, having message panel edges 19a, is interposed between the message attachment frame 17 and the recessed panel 8. The message panel 19 is typically translucent glass or plastic. As shown in FIG. 5, the message panel edges 19a of the message panel 19 face the light openings 10 in the recess extension panel 7. As shown in FIG. 3, multiple fastener openings 19b may extend through the message panel 19 and register with the respective fastener openings 17a provided in the message attachment frame 17. Accordingly, fasteners 22 may be extended through the fastener openings 17a provided in the message attachment frame 17 and the registering fastener openings 19b provided in the message panel 19, and threaded into the respective bosses 9, as shown in FIG. 6, to detachably attach the message attachment frame 17 and the message panel 19 of the message attachment 16 to the device casing 2.

Figure 2:
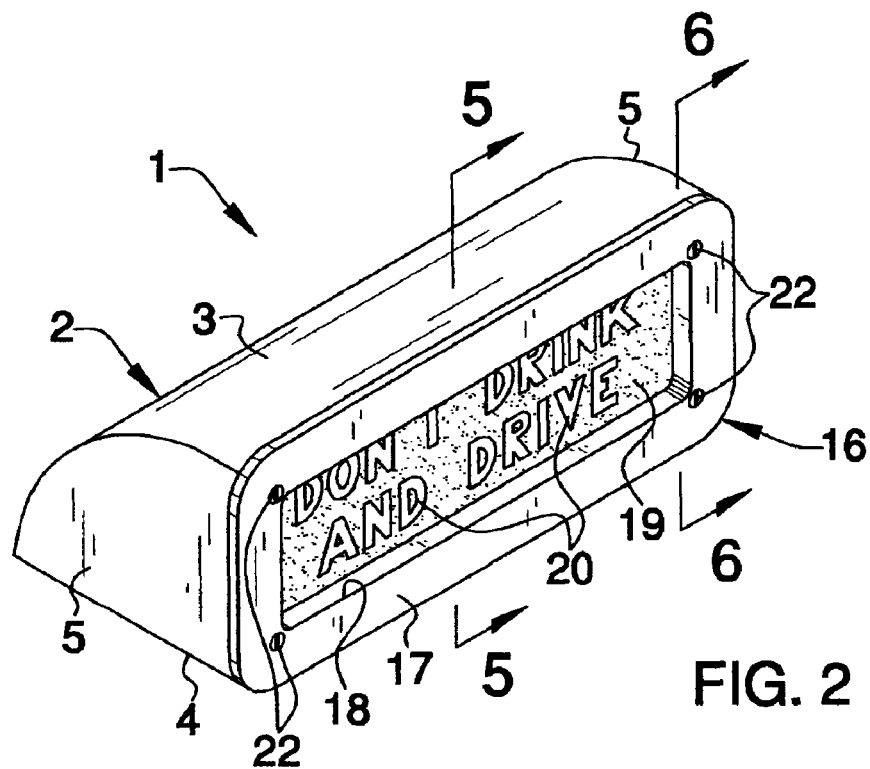
FIG. 2 is a front perspective view of an illustrative embodiment of the brake-actuated message device.

As shown in FIGS. 2 and 3, a message 20 is engraved or otherwise provided in the message panel 19. The message 20 may express a religious sentiment or belief such as "JESUS SAVES", for example, or a sports slogan such as "I LOVE FOOTBALL", for example. Other examples of the message 20 include driving-related messages such as "DRIVE SAFELY", "DON'T DRINK AND DRIVE", "SPEED KILLS" and "EAT MY DUST", for example.

As shown in FIG. 5, a lighting module 26 is provided in the casing interior 12 of the casing 2. Multiple lights 27, such as LEDs, for example, are seated in the respective light openings 10 provided in the recess extension panel 7. Light wiring 28 electrically connects the lights 27 to the lighting module 26. Brake circuit wiring 30 extends from the lighting module 26, typically through the wiring opening 4a in the bottom panel 4 of the device casing 2. The brake circuit wiring 30 is connected to the brake circuitry (not shown) of the vehicle 32, which may be conventional. Accordingly, upon application of the brakes (not shown) of the vehicle 32, the lighting module 26 energizes the lights 27, facilitating illumination of the message panel 19, and the message 20 engraved therein, from the message panel edges 19a of the message panel 19.

As shown in FIG. 1, in typical use the device 1 is mounted at the rear end of a vehicle 32, such as on the inside of the rear window 33 of the vehicle 32, for example. The device 1 may be attached to an interior surface (not shown) in the vehicle 32 such as by, for example, extending mount fasteners (not shown) through the respective mount openings 4b (FIGS. 4 and 6) and through registering mount openings (not shown) provided in the interior surface of the vehicle 32. The brake circuit wiring 30 (FIG. 5) is connected to the brake circuitry (not shown) of the vehicle 32. Accordingly, upon application of the brakes (not shown) of the vehicle 32 during driving of the vehicle 32, the lights 27 illuminate the message panel 19. The message 20 engraved in the message panel 19 is therefore visible to drivers behind the vehicle 32 through the frame slot 18 in the message attachment frame 17 of the message attachment 16.

Figure 7:
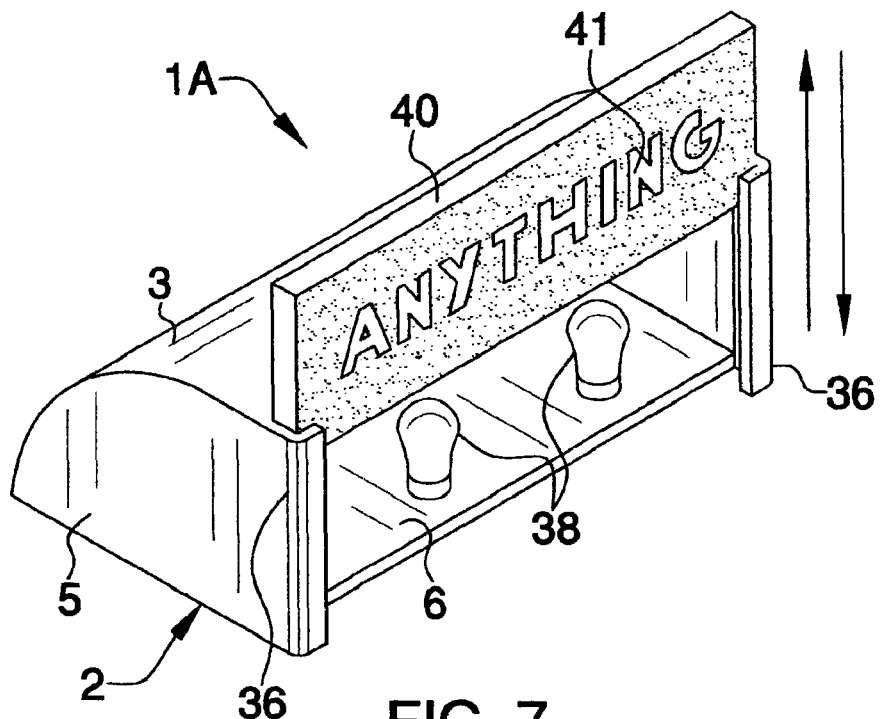
FIG. 7 is a front perspective view of an alternative illustrative embodiment of the brake-actuated message device.

Referring next to FIG. 7 of the drawings, an alternative illustrative embodiment of the brake-actuated device 1a includes a pair of spaced-apart message panel brackets 36 provided on the front panel 6, typically adjacent to the respective side panels 5 of the device casing 2. At least one, and typically, multiple lights 38, each of which may be an LED, for example, is embedded in or provided on the front panel 6 of the device casing 2. Each light 38 is connected to the lighting module 26 (FIG. 5) typically via light wiring 28. A message panel 40, which is typically transparent or translucent glass or plastic, can be detachably inserted between the message panel brackets 36. A selected message 41 is engraved or otherwise provided in the message panel 40. Accordingly, during application of the brakes of the vehicle 32 (FIG. 1), the at least one light 38 is energized, illuminating the message panel 40 and the message 41 therein.

Figure 8:
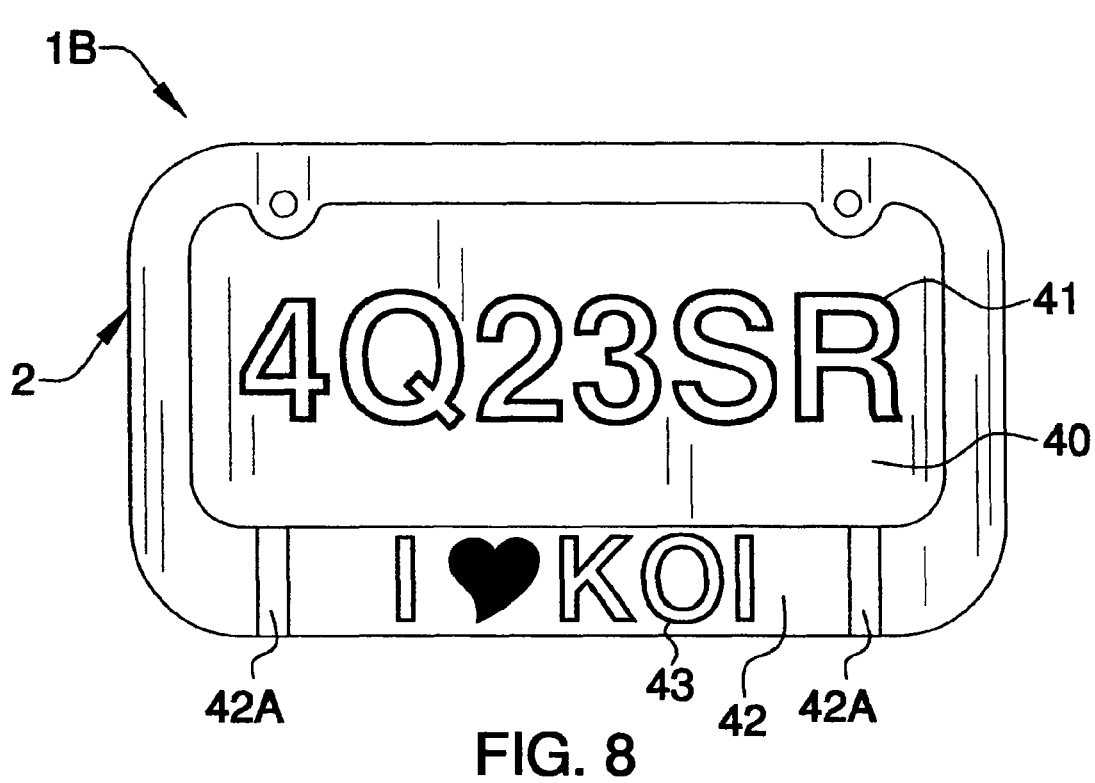
FIG. 8 is a front view of another alternative illustrative embodiment of the brake-actuated message device.
Figure 9:
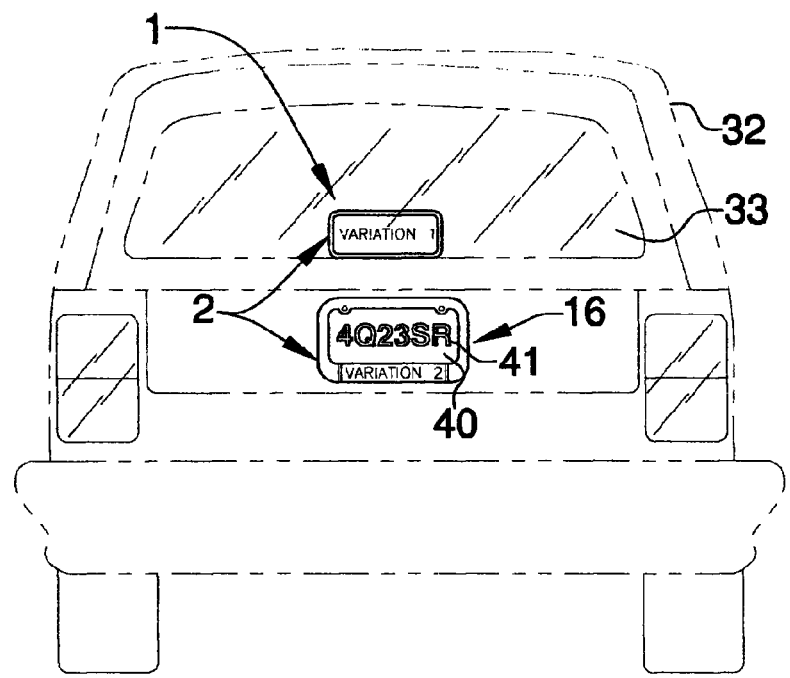
FIG. 9 is a front view of another alternative illustrative embodiment of the brake-actuated message device, provided at a rear end of a vehicle.

Referring next to FIGS. 8 and 9 of the drawings, in another alternative illustrative embodiment of the brake-actuated message device 1b, the device casing 2 is shaped generally in the size and configuration of a vehicle license plate frame. The message 41 engraved or otherwise provided in the message panel 40 includes the number and letter combination of the vehicle's license plate. In some embodiments, a stenciled plate 42 having a selected message 43 can be attached to the device casing 2 typically beneath the message panel 40. Spaced-apart brackets 42a may be provided on the device casing 2 to receive the stenciled plate 42. Separate lights 27 (FIG. 5) may be on the device casing 2 and oriented to facilitate illumination of the stenciled plate 42 upon application of the brakes of the vehicle 32.

Figure 10:
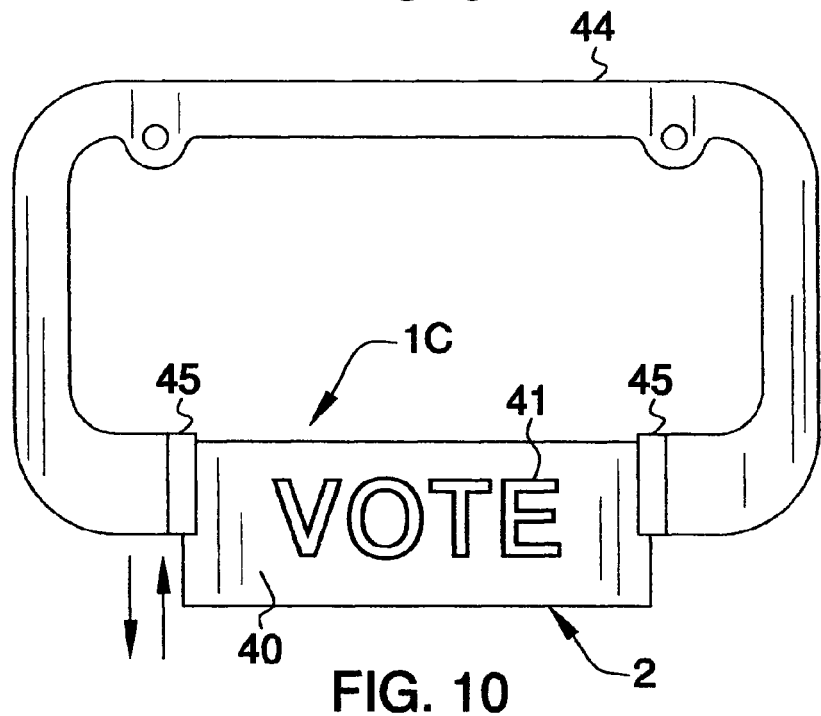
FIG. 10 is a front view of another alternative illustrative embodiment of the brake-actuated message device.

Referring next to FIG. 10 of the drawings, in another illustrative embodiment of the brake-actuated message device 1c, the device casing 2 is sized and configured to fit into a standard-sized license plate frame 44. A pair of spaced-apart brackets 45 may be provided on the license plate frame 44 to receive and support the device casing 2 of the device 1c.

Figure 11:
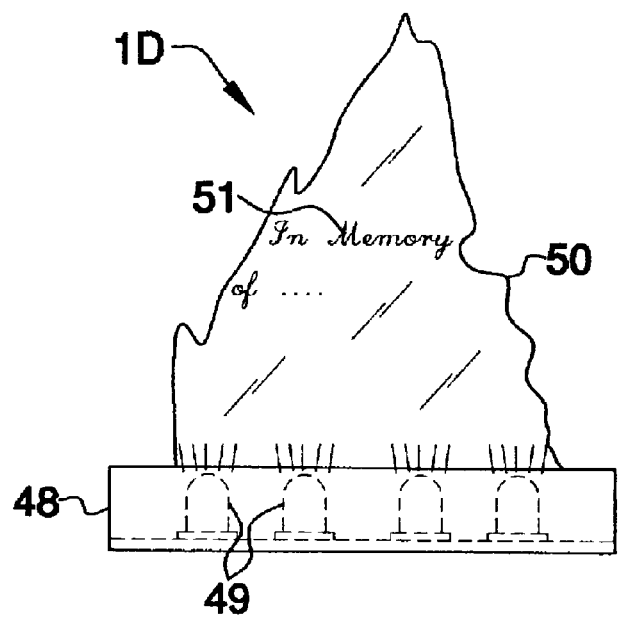
FIG. 11 is a front view of another alternative illustrative embodiment of the brake-actuated message device.
Figure 12:
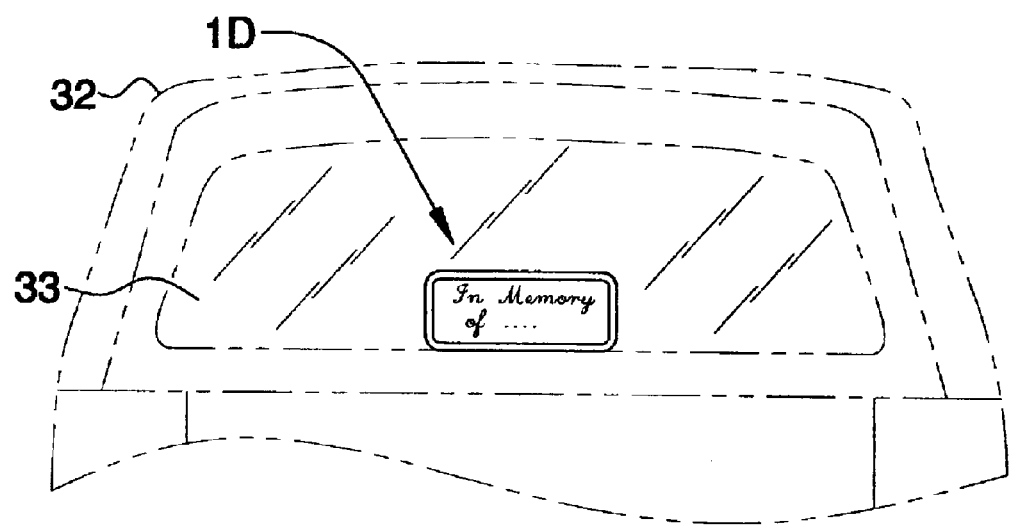
FIG. 12 is a front view of another alternative illustrative embodiment of the brake-actuated message device, provided at a rear end of a vehicle.

Referring next to FIGS. 11 and 12 of the drawings, another illustrative embodiment of the brake-actuated message device id includes a base 48 in which is mounted multiple lights 49. A generally clear or transparent gem rock 50, in which is engraved or otherwise provided a message 51, is supported by the base 48. The base 48 is attached to the vehicle 32 according to the knowledge of those skilled in the art, such as inside the rear window 33 of the vehicle 32. The lights 49 are connected to a lighting module 26 (FIG. 5) which may be provided in the base 48, for example. Actuation of the brakes of the vehicle 32 facilitates energizing of the lights 49 and illumination of the message 51 on the gem rock 50.

While the preferred embodiments of the invention have been described above, it will be recognized and understood that various modifications can be made in the invention and the appended claims are intended to cover all such modifications which may fall within the spirit and scope of the invention.

What is claimed is:

1. A brake-actuated message device, comprising:
   a device casing having a front panel, a generally curved rear panel extending from said front panel, a bottom panel extending between said front panel and said rear panel and a pair of spaced-apart side panels extending between said front panel, said rear panel and said bottom panel and a casing interior provided in said device casing;
   a recess extension panel extending into said front panel and a recessed panel extending from said recess extension panel;
   a plurality of light openings provided in said recess extension panel;
   a plurality of lights seated in said plurality of light openings, respectively;
   a message attachment having a message attachment frame and a message panel carried by said front panel of said device casing, said message panel adjacent to said recessed panel;
   a message provided in said message panel;
   a lighting module provided in said casing interior of said device casing and connected to said plurality of lights; and
   brake circuit wiring connected to said lighting module.

2. The device of claim 1 wherein said recess extension panel is generally perpendicular with respect to said front panel and said recessed panel is generally perpendicular with respect to said recess extension panel.

3. The device of claim 2 wherein said plurality of lights is oriented toward an edge of said message panel.

* * * * *